Jan. 15, 1957 M. E. WOOD 2,777,645
SPINNING REEL
Filed June 25, 1954 3 Sheets-Sheet 1

INVENTOR.
Morris E. Wood
BY
Charles S. Penfold
ATTORNEY

Jan. 15, 1957 M. E. WOOD 2,777,645
SPINNING REEL
Filed June 25, 1954 3 Sheets-Sheet 2
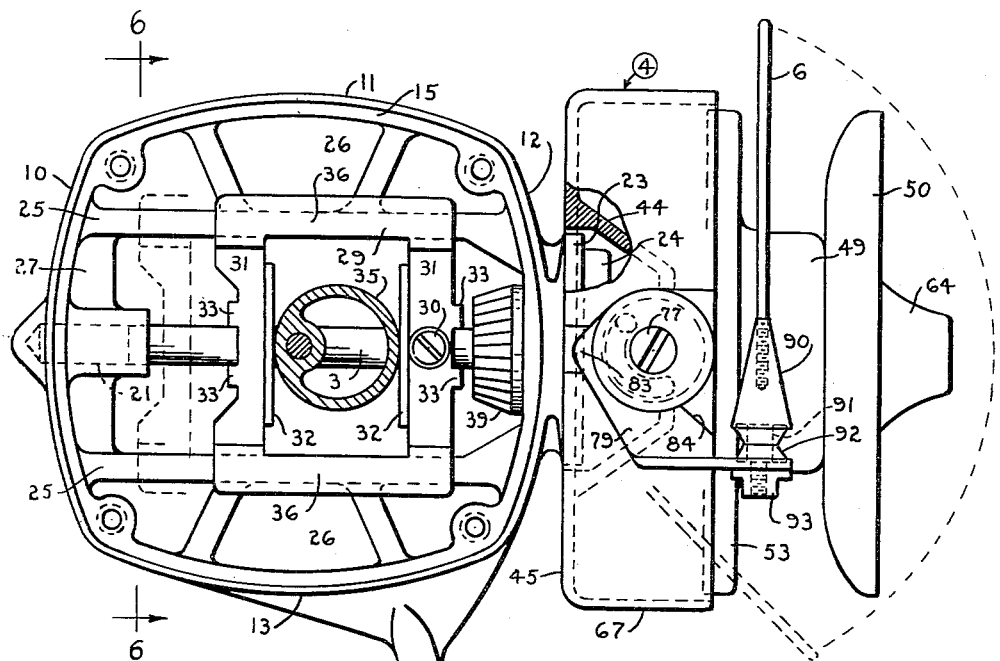
Fig.-5
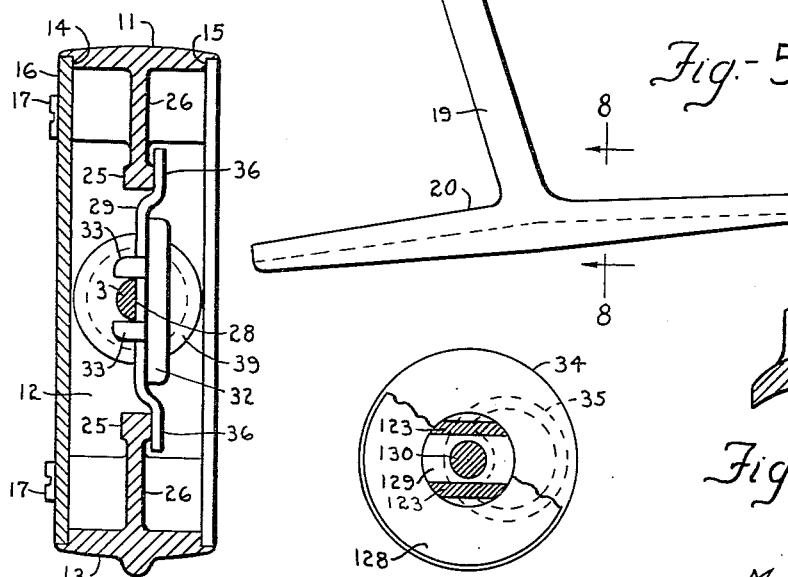
Fig.-6
Fig.-7
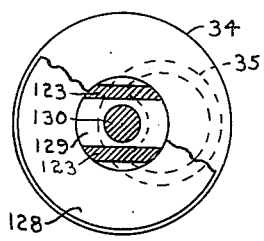
Fig.-8
INVENTOR.
Morris E. Wood
BY Charles S. Penfold
ATTORNEY

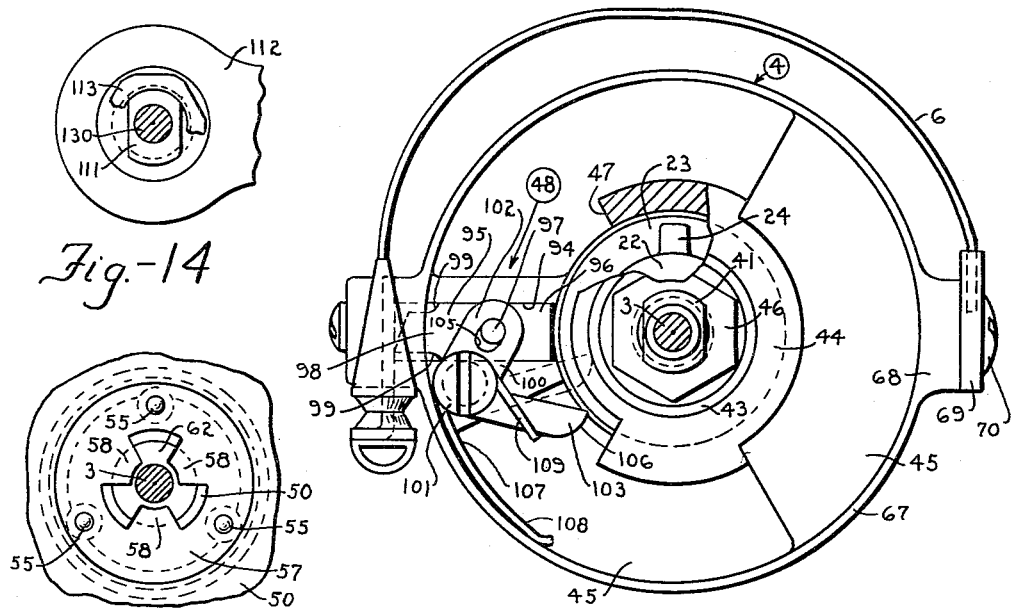
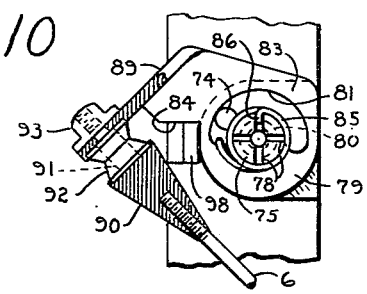
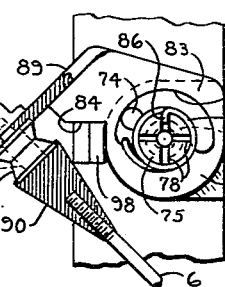
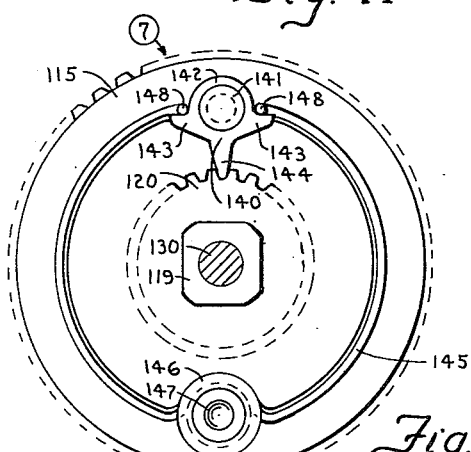
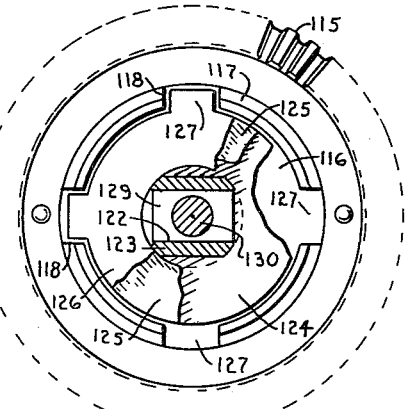

United States Patent Office 2,777,645
Patented Jan. 15, 1957

2,777,645

SPINNING REEL

Morris E. Wood, Bronson, Mich., assignor to Higbie Manufacturing Company, Rochester, Mich., a corporation of Michigan Application June 25, 1954, Serial No. 439,337

27 Claims. (Cl. 242—84.4)

This invention relates generally to fishing tackle, and more particularly is directed to fishing reels of the spinning type.

The majority of reels of this character include, among other things, a cup shaped rotor, a spool, a bail or line guide connected to the rotor, actuating mechanism operatively connected to the rotor and spool, and a drive assembly having a crank for operating the mechanism in a manner whereby to simultaneously rotate the rotor and reciprocate the spool relative to the rotor.

With the foregoing in mind one of the principal objects of the invention is to provide a spinning reel in which improved principles of design and construction are embodied in each of the above components.

More particularly, an important object of the invention is to provide a reel in which the actuating mechanism is operatively connected with the rotor, spool and drive assembly in a unique manner.

A particular object of the invention is to provide a new way of connecting the bail and rotor together so that the bail can be manually pre-set to an inoperative position, preparatory to making a cast and after the cast is made and the reel is again placed in operation the bail will be automatically released so it will return to an operative position for guiding a line onto the spool. More specifically in this respect, the rotor is provided with a mechanism which coacts with the bail and fixed means on the reel for holding and releasing the bail when desired.

An additional object of the invention is to provide a reel which is so designed and constructed that it may be readily modified for use by either a left or right-handed person.

A further object of the invention is to provide a reel which offers advantages with respect to manufacture, assembly, cost and operation.

Other attributes and advantages of the invention will become apparent after the description hereinafter set forth is considered in conjunction with the drawings annexed hereto.

In the drawings:

Figure 5 is a side view of the reel with portions removed and with portions in section to exemplify details of design and construction;

Figure 6 is a transverse section taken through the reel housing to illustrate details of a part of the operating mechanism;

Figure 7 is a transverse section showing the operative relationship between the cam member and a tubular drive shaft associated therewith;

Figure 8 is a transverse section taken through the rod or pole engaging plate of the reel;

Figure 9 is a front view of the reel, with the spool removed to show details of the rotor, the manner of connecting the bail thereto and the unique means employed for releasably holding the bail in the operative line guiding position;

Figure 10 is a view, partially in section, showing a part of a connection between the spool and its shaft;

Figure 11 is a partial view showing details of the structure for controlling the pivotal swing of the bail;

Figure 12 is a transverse section showing the drive or bevel gear with brake elements associated therewith;

Figure 13 is a view showing the clicker mechanism supported on the bevel gear; and Figure 14 is a view depicting the connection between the tubular drive shaft and its support.

Figures 1, 2, 3, 4:
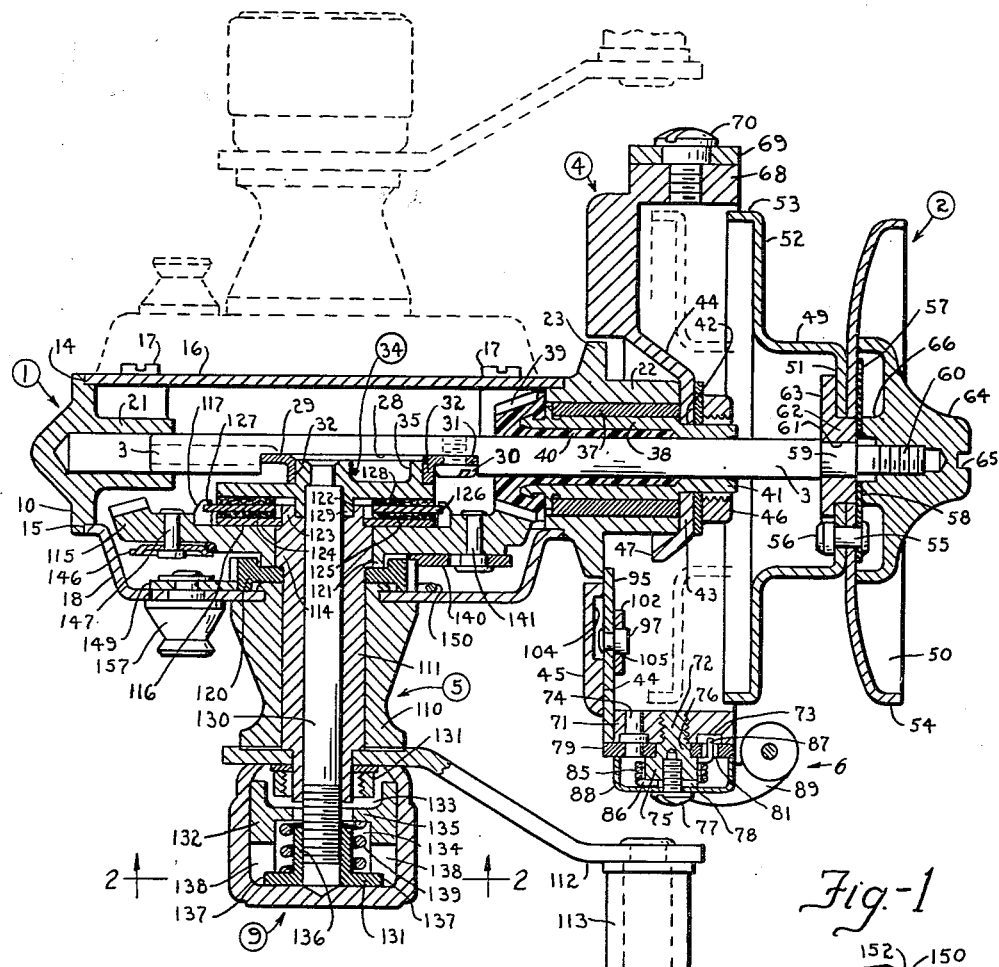
Figure 1 is a longitudinal sectional view through the reel.
Figure 2 is a transverse sectional view illustrating structural details of the manual control for the drag assembly.
Figure 3 is a transverse section showing details of a ratchet and pawl mechanism with the pawl engaging a toothed wheel.
Figure 4 is a view showing the pawl disengaged from the toothed wheel.

The reel is comprised of a plurality of sub-assemblies so as to facilitate manufacture and assembly thereof. More particularly in this regard, and referring to Figures 1, 3, 5 and 13 of the drawing, the reel includes, among other things, a housing generally designated 1, a spool 2 carried by a reciprocable shaft 3, a rotor 4, a drive assembly 5 operatively connected to the shaft and rotor, a bail 6 carried by the rotor, a click mechanism 7, a pawl and ratchet mechanism 8, and a manual control 9 for controlling a drag assembly associated with the drive assembly.

Referring now to Figures 1, 5 and 6 of the drawing the housing 1, constituting a component of the reel, is preferably cast in the form of a relatively short tube, generally square in cross-section with four side walls 10, 11, 12 and 13, the marginal ends of which are correspondingly recessed as indicated at 14 and 15. A tail plate 16 is detachably secured in the recess 14 by screws 17 and a head-cap 18 supporting the drive assembly 5 is detachably secured in the recess 15 by screws not shown.

The side wall 13 of the housing is provided with an angularly disposed pillar or stem 19 having a plate portion 20 for engaging a fish pole or rod.

The side wall 12 of the housing is formed with a tubular bearing 21 for receiving an end of the reciprocable spool shaft 3. The outer end of the bearing is located exteriorly of the wall and is closed to exclude entry of foreign matter into the housing.

The side wall 12 opposite the side wall 10 is formed with a tubular outwardly extending enlargement 22 aligned with the tubular bearing 21. This enlargement is provided with an annular flange 23 and a radial lug 24, the purpose of which will be described subsequently. The side walls are joined together by a pair of parallel rails 25 located on opposite sides of the shaft 3. It will be noted that the rails are adequately reenforced by web structure 26 at their juncture with the walls and that the tubular bearing is also joined to the rails by web structure 27 to impart strength and rigidity to the bearing and housing.

The spool shaft 3 is notched at 28 as shown in Figures 1 and 6 and a driven member or cam follower 29 is detachably secured in a fixed position in the notch by a screw 30. This member is preferably in the form of a rectangular frame having a pair of parallel flat portions 31 disposed transverse to the spool shaft and inset between the rails as shown in Figure 6. Each of the flat portions is also provided with an outturned flange 32 along its inner marginal edge and a pair of inturned fingers 33, the latter of which straddle the shaft 3 as viewed in Figures 5 and 6. The opposed flanges 32 serve as tracks and a uniform motion cam member generally designated 34 has a cam 35 disposed between the tracks 32 so that when motion is imparted to the cam member through the drive assembly the shaft 3 will be reciprocated. The flat portions of the cam follower 29 are provided with a pair of parallel flat shoe portions 36 which engage the outer faces of the rails 25. This arrangement lends balance, stability and smoothness of operation to the slidable relationship between the follower and rails.

As depicted in Figure 1, a tubular bearing 37 is press-fitted into the tubular enlargement 22 on the wall 12 of the housing and a tubular shaft 38 supporting a tubular pinion gear 39 is rotatably mounted in the bearing. The pinion may be constructed of any suitable material but as herein shown is made of nylon which is moulded in interlocking fixed relationship with the tubular shaft 38 to constitute an integral unit. The pinion 39 has a cylindrical portion 40 extending into the tubular shaft 38 and is formed to provide what might be termed an oilless bearing for the reciprocable spool shaft 3. The tubular shaft includes a squared reduced threaded end portion 41 which extends outwardly from the tubular enlargement 22 and through a rectangular opening 42 provided in the end wall 43 of a generally frusto-conical formation 44 projecting inwardly from a bottom wall 45 of the rotor 4. A nut 46 is attached to the threaded end portion of the tubular shaft to secure the unit consisting of the interlocked pinion and shaft to the rotor. The tubular shaft 38, pinion 39 and rotor 4 are thus connected to rotate in unison. The arrangement is preferably such that the pinion may engage the housing and the end wall 43 of the formation may engage the end of the bearing 37 secured in the enlargement so as to hold the parts assembled for smooth operation. It will be noted that the bottom of the formation 44 on the rotor is open and receives the flange 23 of the tubular enlargement of the housing and that the formation is formed with a relatively large side clearance opening 47 so that a part of a bail operating or holding mechanism generally designated 48 in Figure 9 can cooperate with the radial lug 24 on the enlargement 22, the purpose of which will be described subsequently.

The spool assembly which moves axially substantially into and out of the rotor as the latter rotates when the drive mechanism is operated will now be described. The spool assembly comprises a rear part 49 and a front part 50. The rear part of the spool includes a cylindrical portion having a base wall 51, a radial flange 52 extending from the cylindrical portion and a short axial flange 53 extending from the radial flange. The front part 50 of the spool is dished and formed with a forwardly extending flange or lip 54. The diameter of the front part is preferably slightly less than the rear part so as to facilitate release of the line during a cast. As shown in Figures 1 and 10, the base wall of the rear part of the spool is permanently secured in abutting relationship to the central portion of the front part of the spool by three rivets 55 having enlarged heads 56. These rivets also serve to secure a spring 57 having inturned fingers 58 to the outer side of the front part of the spool.

The spool shaft 3 is provided with a reduced cylindrical portion 59 and an adjacent threaded end portion 60. A fitting constituting a seat for the spool is provided with a hole 61 which receives the cylindrical portion of the shaft. This fitting bears against a shoulder on the shaft and is firmly secured to the shaft. This fitting has a cylindrical portion 62 which extends into apertures in the front and rear parts of the spool and serves as a seat for the fingers 58 on the spring 57 as shown in Figures 1 and 10. The fitting also has a radial annular flange 63 provided with three notches which receives the heads 56 of the rivets 55. The base wall 51 of the rear part of the spool engages the annular flange 63 which is of a diameter to lend stability to the spool when secured to the shaft 3 by a nut 64. The nut is relatively large and has an outer sloping or conical surface which is knurled to facilitate manipulation thereof. The nut is also provided with a slot 65 for receiving a tool if necessary to tighten the nut. The inner side of the nut is provided with an annular recess providing clearance for the upset ends of the rivets 55 and with a central annular portion 66 which bears against the fingers 58 of the spring 57. The spring thus serves as a lock washer and affords an arrangement whereby the spool can be readily detachably connected to the spool shaft. As mentioned above, when the drive mechanism is operated the shaft will be reciprocated so that the spool will substantially move into and out of the rotor as the latter rotates.

The bail 6 and its connection with the rotor will now be described. The rotor 4 is preferably cast from aluminum and includes an annular axial or side wall 67. The ends of the bail 6 are connected to the side wall at substantially diametrically opposed locations. More specifically in this regard, the side wall of the rotor is provided with a round boss 68 and one end of the bail is provided with a fitting 69 through which a screw 70 extends into the boss for pivotally securing the fitting thereto. The fitting and boss are of a size to impart a stable motion to the bail. It will be noted that the bail is preferably constructed of wire and that the fitting is provided with a hole in which one end of the bail is anchored. The side wall of the rotor is also provided with another boss 71 similar to the boss 68. The boss 71 is provided with a threaded center aperture within which a pivot stud 72 is threadedly secured. The boss is also provided with annular recess 73 disposed in concentric relationship to the aperture. The base of the recess is provided with a hole and a pin 74 is fixed therein so that the outer end of the pin projects outwardly from the recess. The pivot stud 72 includes a head portion 75 provided with a reduced cylindrical portion 76 and an axially extending threaded aperture which receives a screw 77. The outer end of the head portion 75 of the stud is provided with four equally spaced radial slots 78.

A bracket is secured for pivotal movement on the stud 72. This bracket, as clearly shown in Figures 5, 9 and 11, includes a flat portion 79 having an aperture 80 therein through which the cylindrical portion 76 of the stud extends and an arcuate slot 81 through which the pin 74 extends. The flat portion 79 of the bracket is further provided with an arcuate portion serving as a stop 83 and with an edge serving as an abutment 84. A coiled spring 85 surrounds the pivot stud 72 and one end of the spring is inturned radially at 86 and seated in one of the radial slots 78 in the head of the stud and the other end of the spring is provided with a hook 87 caught in one end of the arcuate slot 81 in a manner to place the spring under tension and maintain the bail in the line retrieving position shown in Figures 5 and 9. The pin 74 engages the other end of the arcuate slot to maintain the bail in this position. A cover 88 conceals the spring and is held in place by the screw 77 secured in the threaded aperture of the stud. If the strength of the spring becomes weak through use or additional spring tension is required the cover 88 can be removed so that the inturned end 86 of the spring can be relocated in a radial slot 78 to obtain the tension desired.

The bracket above referred to has an offset 89 and a short shaft 90 is secured thereto. This shaft has a cylindrical bearing portion 91 which rotatably supports a tubular roller 92 having a V-shaped line guiding surface. The shaft is formed with a reduced portion which extends through an aperture in the offset with a shoulder on the shaft engaging one side of the offset. The outer end of the reduced portion is threaded and a nut 93 is secured thereto to connect the shaft to the offset of the bracket. It will be noted that the offset and shaft are recessed slightly so as to embrace the ends of the roller to impart stability to the roller and at the same time prevent a line from working in between the ends of the roller and the offset and shaft. It will further be noted that the shaft is tapered and provided with an axial hole within which the other end of the bail is anchored in any suitable way.

The bail is arranged for movement with the rotor in an operative line guiding position substantially parallel to the front side of the rotor as shown in Figures 5 and 9 and it can be manually moved to an out of the way angular inoperative position illustrated by the dotted lines in Figure 5. More specifically, the spring 85 serves to urge the bail to the full line operative position with the pin 74 engaging the left end of the arcuate slot 81 in the bracket to limit movement of the bail in a counter-clockwise direction as viewed in Figure 5.

The means 48 employed for locking the bail in the inoperative position and automatically releasing it from such position is unique and will now be described. As clearly depicted in Figure 9, the base wall 45 of the rotor is provided with a radial guideway 94 which extends through the side wall 67 of the rotor below the boss 71. The guideway is formed by raised or thickened portions of the base wall of the rotor. A trip member 95 is slidable in the guideway. This member includes a portion 96 provided with a pin 97 and an outer portion 98 of a smaller cross-dimension than portion 96 to form a pair of shoulders 99. The reduced portion 98 is disposed for movement outwardly through an opening in the side wall of the rotor and the shoulders 99 are adapted to engage stops on the rotor on opposite sides of the guideway to limit outward travel of the trip member. The outer end of the trip member is bevelled as shown in Figure 9.

A lever 100 is pivotally connected to one of the above mentioned thickened portions of the rotor by a screw 101. This lever has a pair of legs 102 and 103. The pin 97 is permanently secured to the trip member and a clearance recess 104 is provided in the base of the guideway for the upset end of the pin. This pin extends through a slot 105 provided in the leg 102 of the lever and the end of the leg 103 is rounded at 106.

A generally U-shaped spring 107 is secured to the screw 101 and a long portion 108 of the spring bears against the side wall of the rotor and a shorter portion 109 has a hook which embraces the leg 103 of the lever so that the lever is normally urged in a counter-clockwise direction as viewed in Figure 9 to urge the trip member radially outward. The arrangement is such that the spring 107 normally urges the bevelled end of trip member 95 against the stop portion 83 of the bracket. However, when the bail is manually moved more than one hundred and eighty degrees to the inoperative position indicated by the dotted lines in Figure 5 the trip member will automatically be moved outwardly by the spring 107 to place an edge of the reduced portion 98 of the member in engagement with the abutment 84 on the offset of the bracket as shown in Figure 11 to hold the bail in such position until it is released. When the trip member moves outwardly the lever 100 is pivoted to locate the leg 103 thereof in the clearance opening 47 of the frustoconical formation 44 of the rotor so that the rounded end 106 of the leg 103 is disposed for engagement by the fixed lug 24 on the enlargement 22 of the housing. When the rotor is rotated in a counter-clockwise direction as viewed in Figure 9 of the rounded end 106 of leg 103 will engage the lug and prevent further rotation of the rotor in this direction, but when rotated in a reverse or clockwise direction a predetermined extent the end of the leg will engage the other side of the lug and cause the lever 100 to gradually pivot and in turn withdraw the trip member and thereby allow the bail, through the action of the spring 85, to snap the bail back to its operative line guiding position as shown by the full lines in Figure 5. The bevelled end of the trip member 95 serves as a cam which is engaged by the edge 84 of the bracket to direct the trip member farther inwardly the moment the bracket is released thereby so that the end 106 of the lever will be moved to prevent its engagement with the lug 24 on the reel frame. Attention is directed to the fact that the base wall of the rotor is also made relatively thick opposite the locking means 48 in order to assist in counterbalancing the weight of such means.

The drive assembly, generally designated 5, supported on the head-cap 13 and the components associated therewith will now be described. The head-cap is cup-shaped in form and its base wall is provided with an opening through which the reduced end of a tubular support 10 is extended and upset for permanently securing the support to the cap. A tubular drive shaft 111 is journalled in this support and its outer end is threaded and oblong in cross-section. A crank 112 having an oblong hole therein receives the outer end of the shaft and a nut 113 is carried by said threaded end for securing the tubular shaft to the support. A handle is carried by the crank. The inner end of the shaft has an enlargement 114 on which a bevel or drive gear 115 is freely journalled for continuous engagement with the nylon pinion gear 39. The inner side of the bevel gear is formed with a round recess 116 and an annular flange 117 extending axially therefrom as shown in Figures 1 and 12. The recess is provided with four equal spaced interruptions 118 which also intersect the flange.

The outer end of the enlargement 114, as shown in Figure 13, has a square formation 119 and a ratchet wheel 120 having an opening receives this formation in a manner to key the wheel for rotation with the drive shaft. The inner side of this ratchet wheel is recessed and receives an outwardly extending annular flange 121 formed on the outer side of the drive gear so that the outer circumferential tooth supporting portion of the wheel will be spaced from the outer side of the bevel gear to reduce friction therebetween. The outer side of the ratchet wheel is also recessed so that its base wall engages the upset end of the tubular support 110.

The inner end of the enlargement 114 is provided with a transverse slot 122 and a square formation 123 similar to the formation 119, and a round plate 124 having an opening therein receives the formation 123 in a manner to key the plate for rotation with the tubular shaft. This plate may bear against the base of the round recess 116 in the bevel gear and provides a smooth bearing surface for a gear. A round flat resilient brake element 125 surrounds the enlargement and bears against the plate. Another flat plate 126 is provided with a clearance opening for the enlargement and has four radial projections 127 which fit in the interruptions 118 to key the plate for movement with the gear and another flat resilient brake element 128 is interposed between this plate and the outer smooth surface of the cam member 34. It will be noted that the plates 124 and 126 and the brake elements 125 and 128 are located substantially within the confines of the round recess 116 and the axial flange 117 for control purposes.

The cam member 34 is formed to include a round flat portion having the cam 35 on its inner side. The cam 35 is in the form of a hollow eccentric having a peripheral surface which is disposed between and cooperates with the track portions 32 on the cam follower 29. The outer side of the cam has a generally square formation 129 which fits in the transverse slot 122 of the tubular drive shaft 111 to key the cam member for movement therewith. A solid shaft 130 extends through the tubular drive shaft and has its inner end secured to the center of the cam member 34 and its outer end is threaded and carries a nut 131 which is mounted in the manual control or drag knob 9. As will be described more in detail later the arrangement is such that when the control knob 9 is tightened the cam will be pulled outwardly to clamp the brake elements and thereby control the degree of friction between the cam and the gear to retard movement of the gear which floats on the tubular drive shaft.

The control knob 9 above referred to embodies improved principles of design and construction and will now be described. A fitting 132 is secured against movement within the chamber of the knob by flanging the rim of the knob inwardly as shown in Figure 1. The fitting is provided with recesses 133 and 134 to form a wall 135 having a clearance opening therein through which the cam shaft 130 extends. The recess 133 provides clearance for the nut 113 which secures the tubular drive shaft 111 to the support. The nut 131 is disposed in the knob and has an internally threaded tubular portion 136 which receives the threaded end of the cam shaft. This nut also has a pair of radial projections 137 which project outwardly into notches 138 provided therefor in the fitting to key the nut for slidable movement in the fitting as shown in Figures 1 and 2. A helical compression spring 139 surrounds the tubular portion of the nut and one end is seated in the recess 134 and its other end bears against the radial projections 137 on the nut. The arrangement is such that when the knob is tightened on the cam shaft the cam member will be pulled outwardly to compress the brake elements in a manner to produce a friction drive or clutch which can be varied by merely manipulating the knob as desired to control the operation of the rotor which is actuated by the bevel gear. This frictional drive mechanism is under the direct influence of the compression spring which when compressed serves to resiliently pull the cam member toward the plate 124 which is keyed to and held against outward movement on the drive shaft. The knob is knurled to facilitate turning thereof and the spring serves to hold the knob against the crank 112 and maintain the knob in any position to which it is adjusted. The drag is sensitive, yet positive in operation, and due to the large size of the knob the drag can be readily adjusted while playing a caught fish. Also, this arrangement in combination with the other structure prevents the line from twisting even though the drag may slip.

The click mechanism 7 may be designed and constructed in various ways but as illustrated in Figure 13 is primarily supported on the outer side of the drive or bevel gear 115 and cooperates with the ratchet wheel 120 above referred to. More particularly in this regard, the outer side of the bevel gear is provided with a relatively large circular boss from which the annular flange 121 extends. A click hammer 140 is pivotally and slidably supported on a headed pin 141 secured to the rear side of the bevel gear adjacent the periphery of the boss. More specifically in this respect, the hammer is provided with a body portion having a longitudinal slot therein through which the pin extends. The body is formed with a round portion 142, outwardly extending corresponding arms or wings 143 and a tapered finger 144 located between the arms. A generally round wire spring 145 surrounds the boss and has an inturned curved mid-portion which is located in a recess provided in the boss diametrically opposite the pin 141 which holds the hammer. A flanged washer 146 is secured by a pin 147 to the outer side of the gear so that its flange secures the spring in the recess. The arcuate portions of the spring which extend from the washer are preferably slightly bowed outwardly and their ends are formed with offsets 148 which are disposed on opposite sides of the rounded portion of the hammer. The offset ends of the spring normally engage the round portion and arms of the hammer so as to urge the hammer in a direction to cause its finger to continuously engage the teeth on the ratchet wheel. The arrangement is such that when the wheel rotates with the drive shaft the hammer will continuously click on the teeth of the ratchet wheel.

The ratchet and pawl mechanism, generally designated 8, clearly depicted in Figures 3 and 4, is preferably carried by the inner side of the cup shaped head-cap 18 so that a pawl 149 constituting a component of the mechanism can be manipulated to engage and disengage the ratchet wheel. This mechanism includes a generally round wire spring 150 somewhat similar to the spring 145 above referred to. The spring 150 has a generally U-shaped end 151 and a curved end constituting a detent 152. The U-shaped end of the spring is held in place against the cap by an elongated strap 153 having an offset which receives the spring end. Rivets 154 permanently secure the strap to the cap. The spring is so formed and connected to the head-cap that the detent 152 of the spring normally bears against the inner surface of the head-cap and the pawl 149.

Attention is directed to the fact that the strap is formed to provide a rest portion 155 and a bearing portion 156 arranged on an angle with reference to the rest portion. The pawl is connected for slidable and pivotal movement on the cap by means of a manually operable button 157. This button is provided with a shaft which extends through a radial slot 158 provided in the head-cap and through a hole provided therefor in the pawl. A washer 159 is permanently attached to the inner end of the shaft so as to lock the pawl to the button. The pawl is provided with an edge 160 which is selectively engageable with either the rest portion or bearing portion of the strap. The pawl is also formed with an edge 161 disposed at an acute angle to the edge 160. The pawl is further provided with a notch 162 and a projection 163 having an edge forming a part of the notch. The projection is adapted to engage the teeth on the ratchet wheel.

With this arrangement, it will be evident from Figure 4 that when the button is in its outermost position, the detent 152 of the spring is seated in the notch 162 of the pawl and forces the edge 160 of the pawl against the rest portion 155 of the strap to locate the pawl away from the ratchet wheel. When the button is moved inwardly, the detent 152 will ride out of the notch and onto the edge 161 so that the edge 160 of the pawl will engage the bearing portion 155 of the strap to locate the projection 163 on the pawl in engagement with the teeth on the ratchet wheel as exemplified in Figure 3. With this setup, the pawl will pivot and rock on the strap at point 164 between the rest and bearing portion of the strap when the ratchet wheel is rotated in a clockwise direction as viewed in Figure 3, but when an attempt is made to rotate the wheel in a counter-clockwise direction by the crank 112, the pawl is forced by a wedging action between the wheel and the strap and acts as a stop to prevent rotation of the cam member and drive gear in the counter-clockwise direction.

As mentioned in the fore part of the specification one of the objects of the invention is to provide a reel that can be readily modified for use by a left-handed person. This is accomplished in part by making the recesses 14 and 15 in the housing of corresponding size and shape as well as the tail plate 16 and head-cap 18 so that the plate and cap can be secured in either of the recesses as exemplified by the dotted lines in Figure 1. At the factory, some of the components will be made directly opposite those illustrated and then will be assembled in reverse positions to obtain a reel which is operable and suitable for a left-handed person.

Having thus described my invention, it is obvious that various modifications may be made in the same without departing from the spirit of the invention, and, therefore, I do not wish to be understood as limiting myself to the exact form, construction, arrangement, and combination of parts herein shown and described.

I claim:

1. A rotor assembly for a spinning reel, said assembly comprising a cup adapted for disposition with respect to a spool, spindle means extending radially outward from the cup, a bracket mounted on the spindle means for pivotal movement about the axis of the spindle means, a line guide carried by the bracket, an opening provided in the bracket, a stop extending into the opening, resilient means having a first portion connected to the spindle means and a second portion disposed in the opening of the bracket for urging the bracket in a direction to cause an edge of the opening to engage the stop and thereby position the line guide in a line guiding position, spring pressed means carried by the cup for automatically engaging the bracket to lock the bracket and line guide in an inoperative position when they are moved to such position, and said spring pressed means also being engageable with a part of the reel to unlock the bracket and line guide from said inoperative position so that the resilient means will automatically return the bracket and line guide back to said line guiding position.

2. The structure defined in claim 1, in which the spindle means is provided with a plurality of slots and the first portion of the resilient means may be disposed in any one of the slots for varying the pressure exerted by the resilient means.

3. An assembly for a spinning reel, said assembly comprising a rotor having a base wall and a cylindrical side wall, said base wall being formed with raised substantially radially extending formations to provide an open ended guideway, a slidable member disposed in the guideway and having an outer extremity extending outwardly from the side wall of the rotor, means on the member engageable with the rotor for limiting outward movement of the member, said member having a projection thereon, a lever pivotally mounted on the base wall of the rotor and provided with a slot receiving the projection on the member in a manner whereby oscillatory movement of the lever will impart reciprocatory movement to the member, and a spring acting on the lever for normally urging the member outwardly.

4. The structure defined in claim 1, in which the spindle means is provided with a plurality of slots and the first portion of the resilient means may be disposed in any one of the slots for varying the pressure exerted by the resilient means, and a cover is connected to the spindle means for covering and securing the resilient means in place.

5. The structure defined in claim 1, in which a cover surrounds the major part of the resilient means and means carried by the spindle means serves to detachably secure the cover in place.

6. A rotor assembly for a spinning reel, said assembly comprising a rotor adapted for disposition with respect to a spool, spindle means extending radially outward from the rotor and provided with a plurality of receiving means, a bracket mounted on and held in relation to the spindle means for pivotal movement about the axis of the spindle means, a line guide carried by the bracket, an opening provided in the bracket, a stop extending into the opening, coiled resilient means having a first portion disposable in any one of the receiving means for varying the tension of the resilient means and a second portion connected to the bracket for urging the bracket in a direction to cause an edge of the opening to engage the stop and thereby position the line guide in a line guiding position, spring pressed means carried by the rotor for automatically engaging the bracket to lock the bracket and line guide in an inoperative position when they are moved to such position, and said spring pressed means also being engageable with a part of the reel to unlock the bracket and line guide from said inoperative position so that the resilient means will automatically return the bracket and line guide back to said line guiding position.

7. A rotor assembly for a spinning reel, said assembly comprising a cup adapted for movement with respect to a spool and having a base wall and a side wall, a spindle member extending radially outward from the side wall of the cup, a bracket member mounted on the spindle for pivotal movement about the axis of the spindle, a line guide carried by the bracket member, an opening provided in the bracket, a stop extending into the opening, resilient means having portions respectively connected to the spindle and bracket for urging the bracket in a direction to cause an edge of the opening to engage the stop and thereby position the line guide in a line guiding position, a radial guideway formed in the base wall of the cup and extending through the side wall, a slide movable in the guideway and provided with a cam for engaging the bracket, a lever pivoted on the base wall and having a leg connected to the slide, a spring acting on the lever to cause the slide to automatically engage and lock the bracket and line guide in an inoperative position when they are moved to such position, and said lever also having another leg for engagement with a part of a reel to unlock the bracket and line guide from said slide from said inoperative position so that the resilient means will automatically return the bracket and line guide back to said line guiding position and the bracket will engage the cam on the slide for retracting the latter during return of the line guide.

8. The structure defined in claim 7, in which one of the members is provided with a plurality of receiving means and one of the portions of the resilient means may be disposed in any one of the receiving means for varying the pressure exerted by the resilient means.

9. An assembly for a spinning reel, said assembly comprising a rotor having a base wall and a cylindrical side wall provided with an opening, said base wall being formed with raised substantially radially extending formations to provide a guideway aligned with said opening, a slidable member disposed in the guideway and having an outer extremity extendible outwardly through the opening in the side wall of the rotor, means on the member engageable with the rotor for limiting outward movement of the member, said member having a projection thereon, a lever pivotally mounted on the base wall of the rotor and provided with a slot receiving the projection on the member in a manner whereby oscillatory movement of the lever will impart reciprocatory movement to the member, and a spring acting on the lever for normally urging the member outwardly.

10. The structure defined in claim 9, in which a spring pressed line guide bracket is pivotally mounted on the side wall of the rotor for engagement with the slidable member to lock the bracket in a predetermined position.

11. An assembly for a spinning reel, said assembly comprising a rotor having a base wall and a cylindrical side wall provided with an opening, said base wall being formed with a pair of substantially radially extending formations to provide guideway aligned with the opening, a bracket pivoted on the side wall of the rotor, a slidable member disposed in the guideway and having an outer extremity provided with a cam surface extendible through the opening in the side wall of the rotor for engaging the bracket, means for limiting outward movement of the member, a lever pivotally mounted on one of the radial formations entirely within the confines of the rotor and overlying the member to trap the member in the guideway, a pin and slot connecting the lever and the member in a manner whereby oscillatory movement of the lever will impart reciprocatory movement to the member, a coiled spring having a leg acting on the lever and a leg bearing against the side wall for normally urging the member outwardly to lock the bracket in one position, and said lever being engageable with a part of a reel to cause movement of the member to unlock the bracket and so that the bracket will engage the cam surface to effect further movement of the member after the lever disengages such a part.

12. The structure defined in claim 11, in which the side wall of the rotor is provided with a spindle, the bracket carries a line guide and is pivoted on the spindle for engagement with the slidable member to lock the bracket in one position, resilient means are connected to the spindle and bracket for automatically urging the bracket and guide thereon to another position when the slidable member is moved inwardly to unlock the bracket, and a cover for the resilient means connected to the spindle.

13. An assembly for a spinning reel, said assembly comprising a rotor having a base wall and a cylindrical side wall provided with an opening, said base wall being formed with substantially radially extending formations to provide a guideway aligned with the opening, a slidable member disposed in the guideway and having an outer extremity provided with a cam surface extendible through the opening, means on the member for limiting its outward movement, a pivot on one of said formations, a lever carried by said pivot, a pin and slot connecting the lever and member in a manner whereby oscillatory movement of the lever will impart reciprocatory movement to the member, a spring acting on the lever for normally urging the member outwardly, a spindle extending outwardly from the side wall, a bracket pivoted on the spindle for engaging the slidable member to lock the bracket in one position, a curved line guide having one end secured to the bracket and another end pivotally connected to the side wall at a location substantially diametrically opposite the spindle, resilient means acting on the bracket for urging the bracket and guide thereon to another position when the slidable member is moved inwardly to unlock the bracket, and said cam surface being engageable by the bracket to additionally move the slidable member after the bracket is unlocked.

14. An assembly for a spinning reel, said assembly comprising a rotor having a base wall and a cylindrical side wall provided with an opening, a line guide movably supported on the rotor, said base wall being provided with substantially radial formations having outer surfaces substantially parallel with the rear surface of the base wall and forming a radial guideway aligned with the opening, a slide member disposed in the guideway and having an outer extremity movable in the opening for engagement with the line guide to hold the guide in a predetermined position, a pivot carried by the base wall, a lever member mounted on the pivot and engageable with the outer surfaces of the formations for trapping the slide member in the guideway, a pin and slot connecting said members in a manner whereby oscillatory movement of the lever will impart reciprocatory movement to the slide, and a spring acting on one of the members for normally urging the slide member outwardly.

15. The structure defined in claim 14, in which the line guide is curved with ends pivotally supported on the side wall of the rotor at substantially diametrically disposed locations and a resilient means is operatively connected to the guide for moving the guide to a line guiding position when released by the slide member.

16. The structure defined in claim 14, in which the line guide has ends pivotally supported on the side wall of the rotor and the spring includes a coiled portion surrounding the pivot and a portion acting on the lever to cause the latter to urge the slide outwardly.

17. The structure defined in claim 14, in which the line guide has ends pivotally supported at substantially diametrically disposed locations on the side wall of the rotor, including resilient means for moving the guide to a line guiding position when the guide is released from the slide, and means on the slide engageable with means on the rotor for limiting outward movement of the slide.

18. An assembly for a spinning reel, said assembly comprising a rotor having a base wall provided with an opening and a cylindrical side wall provided with an opening, said base wall having formations providing a radially extending guideway aligned with the opening in the side wall, a line guide pivoted on the rotor, a slidable member disposed in the guideway and having an outer reduced extremity movable in the opening in the side wall of the rotor for engaging and holding the guide in a predetermined position, said reduced extremity of the slidable member providing a stop means engageable with the rotor for limiting outward movement of the member, a lever pivotally mounted on the base wall of the rotor and operatively connected to the slidable member in a manner whereby oscillatory movement of the lever will impart reciprocatory movement to the slidable member, and said lever having a portion movable in the opening of the base wall for engagement with a part of the reel for actuating the slidable member to release the guide.

19. The structure defined in claim 18, including resilient means operatively connected to the line guide for moving the guide to a line guiding position when released from the slidable member, and means whereby the strength of the resilient means may be adjusted.

20. The structure defined in claim 18, in which the line guide includes a bracket pivotally supported on the side wall of the rotor for engagement with the slidable member, a fitting attached to the bracket, a curved member having its ends respectively connected to the fitting and side wall of the rotor, and a line engaging roller mounted on the fitting.

21. An assembly for a spinning reel, said assembly comprising a rotor having a base wall provided with an opening and a cylindrical side wall provided with an opening, said base wall having formations providing a radial guideway aligned with the opening in the side wall, a line guide pivoted on the rotor, a slidable member disposed in the guideway and having an outer extremity movable in the opening in the side wall of the rotor for locking the line guide in a predetermined position, a lever member pivotally mounted on one of the formations and normally bridging the formations to assist in holding the slidable member in the guideway, a pin and slot operatively connecting the members in a manner whereby oscillatory movement of the lever member will impart reciprocatory movement to the slidable member, a spring for influencing outward movement of the slidable member, and said lever member having a portion movable in the opening of the base wall for engagement with a part of the reel to retract the slidable member.

22. A fishing reel comprising a frame provided with an abutment, a rotor rotatably mounted on the frame and provided with a stop and an opening affording access to the abutment, said rotor having a base wall provided with a radial guideway and a cylindrical side wall provided with an opening aligned with the guideway, a slide mounted in the guideway and provided with a cam at its outer end, means for limiting outward movement of the slide, a lever pivoted on the base wall of the rotor and having a first portion operatively connected to the slide for imparting a reciprocatory movement to the slide when the lever is pivoted, a line guide and a bracket therefor pivoted on the rotor adjacent the opening in the side wall thereof, said bracket having a stop and an abutment thereon, resilient means for urging and normally maintaining the bracket against the stop on the rotor to maintain the bracket and guide in a line winding operative position with the cam end of the slide engaging the stop on the bracket, a spring for urging the slide outwardly to engage the abutment on the bracket to lock the bracket and guide in an inoperative position when the bracket and guide are moved to this position, and said lever also having a second portion disposed in the opening of the rotor for engagement with the abutment on the frame when the bracket and guide are in the locked inoperative position, the arrangement being such that when said second portion of the lever engages the abutment on the frame, the slide will disengage the abutment on the bracket and promptly release the bracket and guide, after which the abutment on the bracket will engage the cam on the slide and move the slide inwardly so that the second portion of the lever is moved to prevent its engagement with the abutment on the frame when the rotor is rotated on the frame.

23. A rotor assembly for a spinning reel, said assembly comprising a cup adapted for disposition with respect to a spool, said cup having a base wall and a side wall, spindle means extending radially outward from the side wall of the cup, said side wall being provided with an aperture, a bracket mounted on the spindle means for pivotal movement about the axis of the spindle means, a line guide carried by the bracket, an opening provided in the bracket, a stop extending into the opening, resilient means having a first portion connected to the spindle means and a second portion disposed in the opening of the bracket for urging the bracket in a direction to cause an edge of the opening to engage the stop and thereby position the line guide in a line guiding position, a movable member mounted on the base wall of the cup for movement in the aperture, spring pressed means carried by the cup for urging the member to engage the bracket to lock the bracket and line guide in an inoperative position when they are moved to such position, and said spring pressed means being engageable with a part of a reel to actuate the member to unlock the bracket and line guide from said inoperative position so that the resilient means will automatically return the bracket and line guide back to said line guiding position.

24. A rotor assembly for a spinning reel, said assembly comprising a cup adapted for disposition with respect to a spool, said cup having a base wall and a side wall, spindle means extending radially outward from the side wall of the cup, said side wall being provided with an aperture, a bracket mounted on the spindle means for pivotal movement about the axis of the spindle means, a line guide carried by the bracket, an opening provided in the bracket, a stop extending into the opening, resilient means having a first portion connected to the spindle means and a second portion disposed in the opening of the bracket for urging the bracket in a direction to cause an edge of the opening to engage the stop and thereby position the line guide in a line guiding position, a movable member mounted on the base wall of the cup for movement in the aperture, a lever carried by the cup for actuating the movable member, a spring acting on the lever for normally urging the lever in a direction to cause the movable member to engage the bracket to lock the bracket and line guide as a unit in an inoperative position when moved to such position, and said lever being engageable with a part of the reel to actuate the movable member to unlock the unit from said inoperative position so that the resilient means will automatically return the unit back to said line guiding position.

25. An assembly for a spinning reel, said assembly comprising a rotor having a base wall and a cylindrical side wall, said base wall being formed with raised substantially radially extending formations to provide an open ended guideway, a slidable member disposed in the guideway and having an outer extremity extending outwardly from the side wall of the rotor, means on the member engageable with the rotor for limiting outward movement of the member, said member having a projection thereon, a lever pivotally mounted on one of the formations and overlying the slidable member, said lever being provided with a slot receiving the projection on the member in a manner whereby oscillatory movement of the lever will impart reciprocatory movement to the member, and a spring acting on the lever for normally urging the member outwardly.

26. An assembly for a spinning reel, said assembly comprising a rotor having a base wall and a cylindrical side wall, a stud element attached to the sidewall, a line guide having a bracket element pivotally mounted on the stud element and being movable to an inoperative position and to an operative line guiding position, a helical spring having its ends respectively connected to the stud element and bracket element for urging the guide toward its line guiding position, one of said elements being provided with a plurality of openings so that one end of the spring may be selectively disposed in any desired opening to adjust the tension of the spring, said base wall being formed to provide a guideway, a slidable member disposed in the guideway and having an outer extremity provided with a cam surface extending outwardly from the side wall of the rotor, means for limiting outward movement of the member, a lever member pivotally mounted on the base wall of the rotor and operatively connected to the slidable member in a manner whereby oscillatory movement of the lever member will impart reciprocatory movement to the slidable member, and a spring acting on one of the members for normally urging the slidable member outwardly to lock the guide in an inoperative position, said lever member having a portion for engaging a part of a reel to cause the slidable member to unlock the guide from said inoperative position, the arrangement being such that after the guide is unlocked its bracket element will be swung by the helical spring to cause the bracket element to engage the cam surface to move the slidable member to actuate the lever member so that the said portion of the lever will be moved to prevent its engagement with the said part of a reel when the rotor is rotated in one direction.

27. A spinning reel comprising a frame provided with an abutment, a cup rotatably mounted on the frame and having a cylindrical side wall and a base wall provided with a forwardly extending portion having an opening therein providing access to the abutment, a stud element extending from the side wall, a line guide having a bracket element pivotally connected to the stud element to permit movement of the guide to operative and inoperative positions, a helical spring having its ends respectively connected to the elements for normally urging the guide to an operative line winding position, one of said elements being provided with a plurality of openings so that one end of the spring can be selectively disposed in any desired opening to adjust the tension of the spring, spring pressed means mounted on the front side of the base wall and having an outer portion extending through the cup and provided with a cam and an inner portion adapted for engagement with the abutment through the opening, the arrangement being such that the outer portion of said means serves to automatically engage the bracket element to lock the guide in an inoperative position when the guide is moved to this position and when the inner portion of said means engages the abutment the outer portion will automatically unlock the guide after which the bracket element will be swung by the helical spring to cause the bracket element to engage the cam to move the inner portion of said means to a position to prevent it from engaging the abutment when the cup is rotated in one direction.

References Cited in the file of this patent

UNITED STATES PATENTS

| | | |
|---|---|---|
| 2,336,737 | Kreis | Dec. 14, 1943 |
| 2,495,621 | Young et al. | Jan. 24, 1950 |
| 2,498,987 | Duncan | Feb. 28, 1950 |
| 2,546,465 | Martini | Mar. 27, 1951 |
| 2,568,986 | Brown | Sept. 25, 1951 |
| 2,599,189 | Mauborgne | June 3, 1952 |
| 2,633,308 | Zientowski | Mar. 31, 1953 |
| 2,712,419 | Martini | July 5, 1955 |
| 2,713,463 | Sarah | July 19, 1955 |

FOREIGN PATENTS

| | | |
|---|---|---|
| 380,939 | Great Britain | Sept. 29, 1932 |
| 498,460 | Great Britain | Jan. 9, 1939 |
| 897,418 | France | Mar. 22, 1944 |
| 924,148 | France | Mar. 3, 1947 |
| 602,922 | Great Britain | June 4, 1948 |
| 1,013,550 | France | Apr. 30, 1952 |
| 136,660 | Sweden | July 22, 1952 |
| 1,053,935 | France | Oct. 7, 1953 |